Feb. 3, 1970 KATSUYUKI IWAI ET AL 3,493,675

DIRECT MAGNETIC RECORDING SYSTEM WITH ACCENTUATION OF VIDEO SYNCHRONIZING PULSES

Filed Dec. 8, 1966 2 Sheets-Sheet 1

United States Patent Office 3,493,675
Patented Feb. 3, 1970

3,493,675

DIRECT MAGNETIC RECORDING SYSTEM WITH ACCENTUATION OF VIDEO SYNCHRONIZING PULSES

Katsuyuki Iwai, Motonori Fukatsu, and Fujio Sato, Tokyo, Japan, assignors to Akai Electric Company Limited, Tokyo, Japan Filed Dec. 8, 1966, Ser. No. 600,238
Claims priority, application Japan, Dec. 11, 1965, 40/76,014
Int. Cl. H04n 5/76, 5/04
U.S. Cl. 178—6.6 9 Claims

ABSTRACT OF THE DISCLOSURE

A direct magnetic recording system is disclosed which accentuates the horizontal video synchronizing pulses which are recorded on a magnetic medium. The system includes a synchronizing signal separator which separates and amplifies the synchronizing pulses from the composite input video signal. The composite video signal and the output of the synchronizing signal separator are separately amplified by a respective record amplifiers and then magnetically and algebraically combined and recorded on a magnetic medium by a recording head. A polarity reversing means is provided so that the output of the synchronizing signal separator may be either additively or substractively combined with the composite video. The bias frequency signal may be applied by a separate cross-field biasing head, an additional winding on the main recording head, or electrically superimposed on the output of either recording amplifier. Two separate reproducing systems are provided depending on whether the composite video and the output of the synchronizing signal separator are additively or subtractively combined.

BACKGROUND OF THE INVENTION

Field of the invention

This invention relates to improvements in and relating to video tape recording and reproducing machines, referred hereinafter substantially throughout the specification to as "tape recorders." More specifically, it relates to an improved magnetic recording system embodied in a tape recorder which operates relying upon the direct recording principle, especially using one or more stationary magnetic heads.

Description of the prior art

Throughout this specification, the term "direct recording" implies a technique which does not rely upon frequency modulation conventionally and broadly in use in the prior art utilizing rotary magnetic heads. The synchronizing pulses referred to hereinafter are the horizontal synchronizing pulses.

Not only in an audio tape recorder, but also in a video tape recorder, is it highly desirable to use the lowest possible tape running speed without sacrificing the quality of the subsequently reproduced information, since in this way a specific length of tape will serve to accommodate a largest possible amount of useful recorded information. This feature is of particular importance in video tape recorders.

With a lowered tape running speed, however, the maximum recordable signal frequency will appreciably decrease, which is disadvantageous especially in performance of video tape recording wherein the signal frequency range is considerably broader in comparison with that of an audio tape recording system.

With reduction of the tape speed, the maximum recordable frequency will shift correspondingly to a lower value and thus, otherwise possible precise and detailed frequency components will be lost in the course of the magnetic recording and therefore from the picture reproduced in a subsequent reproducing stage, resulting in dull and obscure pictorial images.

In consideration of the aforementioned tendency, the finest possible slit gap must be provided in the recording and/or reproducing head, so as to record and/or reproduce the maximum possible signal frequency. As a specific example thereof, a slit gap of the order of 1 micron or still finer may be employed for the practical magnetic head.

Our practical experiments have shown that by using the finest possible recording slit gap formed in the recording or reproducing which is kept stationary on the tape recorder, television signals may well be recorded or reproduced for providing a reproduced picture with reasonably favorable quality.

On the other hand, it has been experienced that with use of such a fine operating slit gap for matching with the higher frequency signal components, lower frequency signal components are lost in the course of reproducing.

More specifically in such a case wherein the tape running speed is 60–120 in./sec. and the reproducing head gap is 1 micron or still finer, direct current components and those of frequencies lower than about 400 c./s. can not be sensed in the course of reproducing, even though they have been recorded on the tape. There is therefore a contradicting condition in the case of recording and reproducing of television signals with use of fine recording and reproducing slit gaps in that direct current and lower frequency signal components may be lost when efforts are directed to the effective recording and reproducing of higher frequency components of television signal.

With the loss of frequency signal components lower than about 400 c./s. as set forth hereinbefore, the reproduced signal may be such that the peaks of the synchronizing pulses contained are positioned at different levels, instead of being fixed at a predetermined constant level, providing thereby a wavy and distorted television signal when observed as a whole for an extended time interval.

As an effective counter measure for recovering the lost lower frequency signal components, the keyed clamping process may be embodied in the reproducing stage, so as to fix the peaks of synchronizing signals of the reproduced television signal advantageously and practically at a predetermined level. According to our practical experiments, however, it is difficult to separate effectively the contained synchronizing pulses from the highly distorted television signal upon being subjected to a regular reproducing step.

SUMMARY OF THE INVENTION

It is therefore the main object of the invention to provide a magnetic recording system highly adapted to record a television signal with use of at least a stationary magnetic head, for obviating the aforementioned conventional drawbacks.

In order to realize the above object, the synchronizing pulses are separated in the recording system according to this invention and accentuated in their magnitude over the normal value and finally mixed with the regular television signal including normal synchronizing pulses. It is natural in this case to keep a precise synchronism between the two series of synchronizing pulses.

It is another object to provide a magnetic recording system which is capable of dispensing with conventional highly complicated mixer circuit means for carrying out the above-mentioned mixing procedure.

These and further objects, features and advantages of the present invention will become more clear as the description proceeds with reference to the accompanying drawings illustrative, by way of example and thus in no limiting sense, of substantially a preferred embodiment of the invention, supplemented by a reproducing system which can process effectively the recorded television signal relying upon the novel recording principle embodied in the invention.

DESCRIPTION OF THE PREFERRED EMBODIMENT

Figures 1, 8:
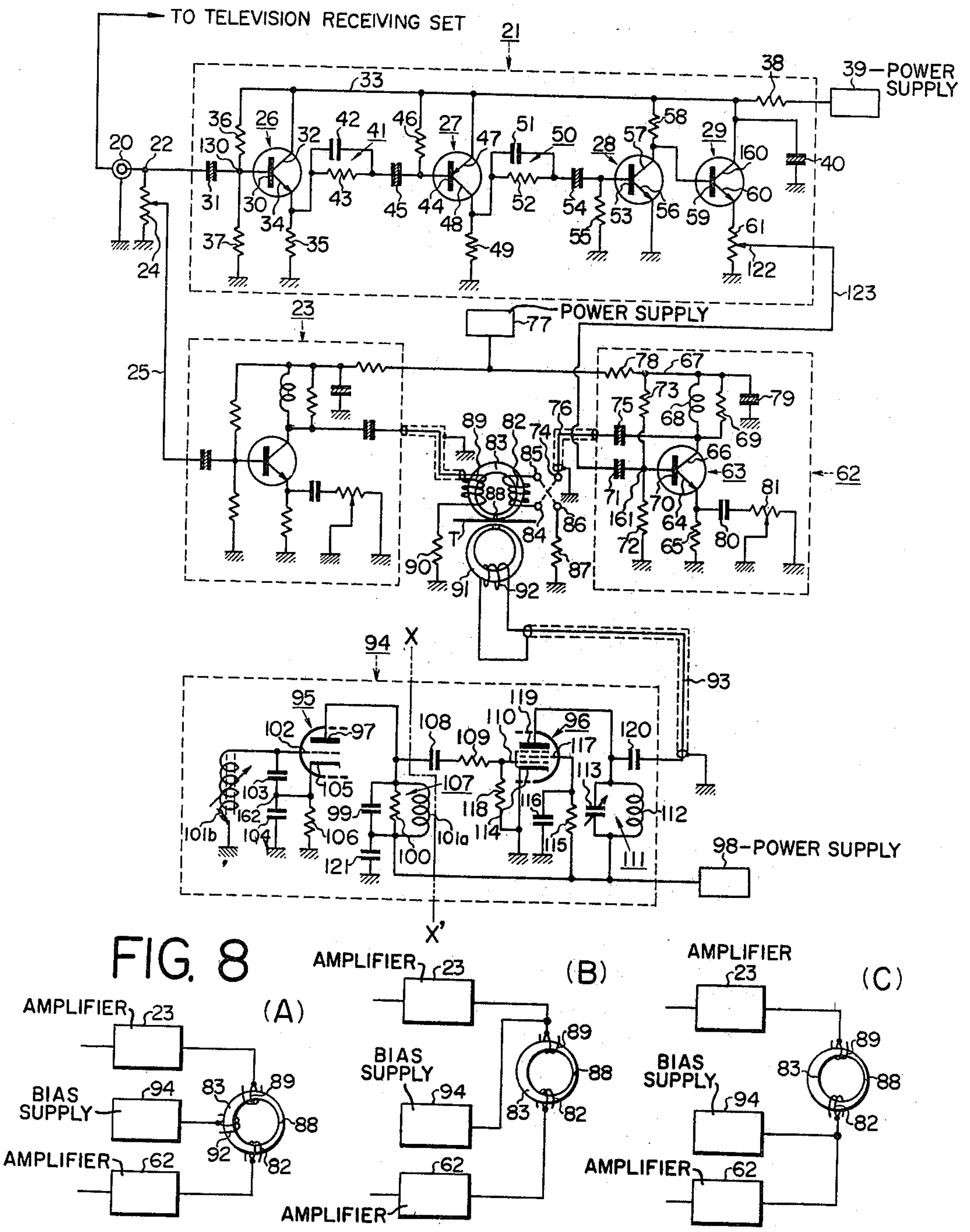
FIG. 1 is a circuit diagram of the magnetic recording system as an embodiment of the invention.
FIGS. 8, (A), (B) and (C), are schematic views illustrative of three modes of magnetic record head employable in the novel recording system.
Figures 2, 3, 4, 5, 6, 7:
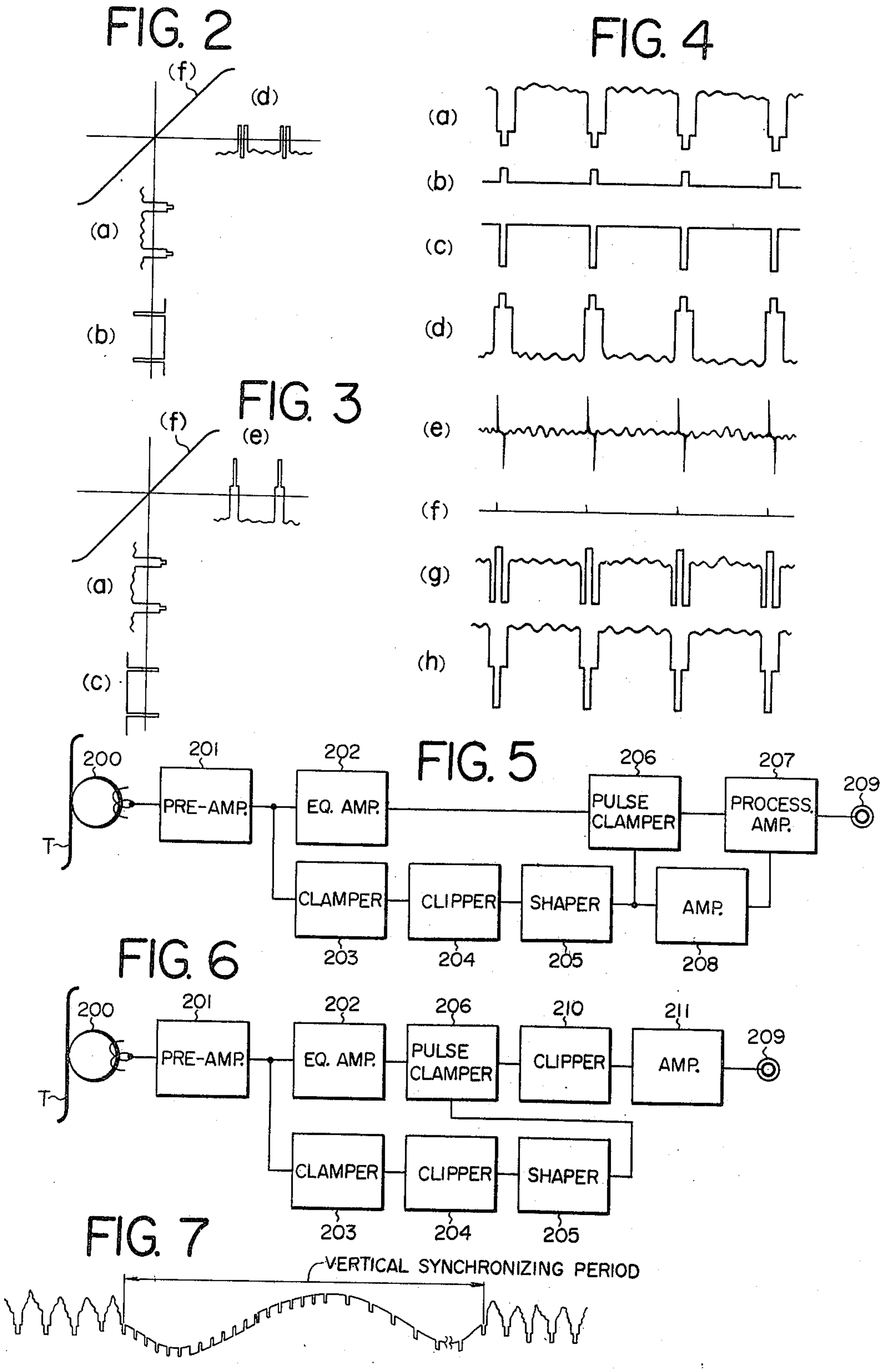
FIGS. 2 and 3 are explanatory diagrams illustrating two modes for the generation of synthetic magnetic recording fluxes.
FIG. 4 is a graph illustrating, in combination, several waveforms appearing at selected various points in the circuit shown in FIG. 1, as well as those of FIGS. 5 and 6.
FIGS. 5 and 6 are schematic block diagrams of two embodiments of a reproducing system which is adapted for use in combination with the recording system according to the invention and on one and the same video tape recorder.
FIG. 7 is an enlarged explanatory graph illustrating a part of a reproduced television signal which is wavy-distorted due to the lack of lower frequency signal components.

Referring now to the drawings, especially FIG. 1 thereof, reference numeral 20 denotes an input terminal of a video tape recorder, adapted for connection with an intermediate stage of a conventional television receiving set, not shown, so as to receive a television signal as illustrated in a highly simplified and schematic way in FIG. 4 at (*a*).

The input television signal is partially applied to a synchronizing signal separator 21 through a junction 22 and to a recording amplifier 23 through the junction 22 and a potentiometer 24, inserted between the junction and ground, thence through a conductive line 25.

The separator 21 comprises four transistors 26, 27, 28 and 29. The transistor 26 is a conventional emitter follower and has a base 30 connected to the input terminal 20 through coupling capacitor 31 and junction 22, a collector 32 connected to a positive line 33 and an emitter 34 connected to ground through a resistor 35. A series-combination of resistors 36 and 37 is connected between the positive line 33 and ground, and the junction at 130 between said resistors is electrically connected to the base 30 of the transistor 26.

The positive line 33 is connected through a voltage divider resistor 38 to a positive terminal of a power supply or a battery 39, shown only by a rectangular block in a simplified manner, and also connected to ground through a by-pass capacitor 40.

A first impulse noise suppressor circuit 41 comprising a parallel-connected capacitor 42 and resistor 43 is connected between the emitter 34 of the transistor 26 and a base 44 of the transistor 27 through a coupling capacitor 45.

The base 44 is connected to the line 33 through a biasing resistor 46, the emitter 47 of said transistor 27 is connected again to the line 33 directly, while the collector 48 of the same transistor is connected to ground through a load resistor 49.

The collector 48 is connected to a base 53 of the transistor 28 through a second impulse noise suppressor circuit 50 comprising a parallel-combination of capacitor 51 and resistor 52, thence through a coupling capacitor 54.

The amplifier transistor 28 arranged in a conventional grounded emitter configuration has its base 53 connected to ground through a biasing resistor 55 its emitter 56, connected directly to ground, and its collector 57 connected to the line 33 through a load resistor 58.

The collector 57 of the transistor 28 is connected to a base 59 of the transistor 29 arranged as a conventional emitter follower of which emitter 60 is connected to ground through a potentiometer 61 and collector 160 is connected directly to the line 33.

The operation of the synchronizing signal separator 21 will now be described.

The applied television signal at the base 30 of the emitter follower 26 appears at resistor 35 as having the same waveform as the input television signal. This output signal is fed through the impulse noise suppressor circuit 41 and the coupling capacitor 45 to the base 44 of the transistor 27, of which the bias is so determined by properly selecting the biasing resistor 46 as to develop a series of synchronizing pulses separated from the input signal, as shown in FIG. 4 at (*b*).

The thus separated synchronizing pulses as appearing at the collector 48 of the transistor 27 are applied through noise suppressor 50 and coupling capacitor 54 to the base 53 of the amplifier transistor 28.

The operations of impulse noise suppressor circuits 41 and 50 are the same so that only that of the first circuit 41 will be described hereinafter.

As may be supposed by any person skilled in the art, when an impulse noise is impressed to the circuit 41, the capacitor 42 is charged up instantly and then releases the accumulated charge, thereby recovering its normal condition, so that the coupling capacitor 45 can not be charged up, and therefore substantially no change in the biasing voltage of transistor 27 will occur due to occasionally impressed noise signals. In this connection, it is to be noted that the transistors 27 and 28 can operate normally, even when various impulse noises are impressed thereto.

The amplified synchronizing signals of negative polarity, as shown at (*c*) in FIG. 4 are taken from the collector 57 of the amplifier 28 and then applied to the base 59 of the transistor 29. The output from the emitter follower 29, upon subjected to proper modification in its amplitude by an occasional and necessary adjustment of the potentiometer 61, is applied to a recording amplifier 62 through adjustable slider 122 of the potentiometer and a conductive line 123.

The recording amplifiers 62 and 23 are designed to amplify signals to be recorded and to compensate for distortion caused by the aforementioned troubles as met in the course of magnetic recording and reproducing. These two amplifiers are of the same design, so that a description of the amplifier 62 only will be set forth. The recording amplifier 62 comprises a transistor 63, having its emitter 64 connected through a resistor 65 to ground, and its collector 66 connected to a positive line 67 through a peaking coil 68 shunted by a damping resistor 69. The peaking coil is provided to give additional high frequency emphasis, as well known to those skilled in the art. The base 70 of the transistor 63 is connected through a coupling capacitor 71 and the line 123 to the slider 122 of the potentiometer 61. Series-connected resistors 72 and 73 are connected between the positive line 67 and ground, the junction at 161 between the two resistors being connected to the base 70 of the transistor 63. The collector 66 of the transistor 63 is connected to a terminal 74 through a coupling capacitor 75 and a shielded line 76 of which the outer conductor is connected to ground.

The positive line 67 is connected to a positive terminal of a power supply or a battery 77, shown only by a rectangular block in a simplified manner, through a voltage divider resistor 78, on the one hand, and to ground through a by-pass capacitor 79, on the other. Between the emitter 64 of the transistor 63 and ground are connected a series-connected capacitor 80 and potentiometer 81, the impedance of which combination at signal frequencies is selected to be considerably smaller than the resistance value of the emitter resistor 65, thereby to increase the amplitude of the output signal at higher signal frequencies.

The synchronizing signals delivered from the separator 21 are amplified and processed as mentioned here in before in the recording amplified 62 and then fed to a recording coil element 82 which is wound on a recording head 83, through the coupling capacitor 75, the shielded line 76 and terminals 74 and 84.

The ends of the recording coil element 82 are connected to terminals 84 and 85, respectively. A terminal 86 is connected to ground through a resistor 87. These terminals 74, 84, 85 and 86 are provided to make the outputs of the two recording amplifiers 23 and 62 combined positively or negatively, as will be later more fully described.

In case that the pair of terminals 74 and 84, and the other pair of terminals 85 and 86 are connected, respectively, as shown by dotted lines in FIG. 1, the two outputs are combined positively. On the contrary, when terminals 74 and 85 are connected directly with each other and the remaining terminals 84 and 86 are also connected directly, the two outputs are combined negatively.

The recording head 83 is formed with a recording slit gap 88 which may preferably be of the order of 1 micron or less. The coil element 82 may comprise 100 turns of insulated fine copper wire.

The television signal applied to the recording amplifier 23 and processed therein as shown in FIG. 4 at (*d*), is fed to a recording coil element 89 equally wound on the same recording head 83 which may comprise, by way of example, 100 turns of insulated fine copper wire and connected to ground through a resistor 90. Thus, the two output signal currents from the amplifiers 23 and 62 are magnetically combined together, as will be described more in detail hereinbelow with reference to FIGS. 2 and 3, and recorded on a magnetic tape T through the intermediary of the recording slit gap 88.

The tape T, illustrated only schematically by a short straight line, is driven at a relative constant speed such as 60–120 inches per second, for instance, with its magnetic layer kept in sliding contact with the slit gap 88 of the stationary head 83, although the tape drive mechanism has been omitted from the drawing for simplicity thereof and on account of its very familiar nature.

At the backside of the running tape, yet preferably being kept at a small distance therefrom, there is provided a biasing magnetic head 91 in a close proximity of the recording head 83. This arrangement is well known as the cross-field head arrangement and thus no further detailed description thereof is necessary. This head 91 is provided with a biasing coil 92, which is connected through a shielded line 93 with a high frequency biasing current source 94, comprising a conventional plate resonance triode oscillator 95 and a pentode power amplifier 96.

The plate electrode 97 of the triode is connected to a positive power supply 98, shown only schematically by a rectangular block, through a resonant circuit 107 comprising a parallel-combination of capacitor 99, damping resistor 100 and secondary winding 101*a* of a transformer. The grid 102 of the triode 95 is connected to ground through a winding 101*b* which may be deemed as the primary winding for the aforesaid transformer, the two transformer windings being separately shown in the drawing for better understanding of the related circuit arrangement.

Series-connected capacitors 103 and 104 are connected between the grid 102 and ground. The cathode 105 of the triode 95 is connected to ground through a resistor 106 and also connected directly to a junction 162 between capacitors 103 and 104. When a shock is imposed mechanically or electrically onto the triode 95, it will start to oscillate, as well known to those skilled in the art.

The output signal from the triode 95 is fed to a control grid 110 of the power amplifier pentode 96 through a coupling capacitor 108 and a damping resistor 109. The pentode 96 has its plate 119 connected to the positive power supply 98 through the intermediary of a resonant circuit 111 comprising a parallel-combination of inductor 112 and variable capacitor 113, the resonant frequency of the circuit being selected to be same as that of the resonant circuit 107. The cathode at 114 of the pentode is connected directly to ground. A voltage divider resistor 115 is inserted between the positive power supply 98 and a screen grid 117 of the pentode 96, said grid being connected to ground through a by-pass capacitor 116, as shown. The control grid 110 is further connected to ground through a resistor 118.

Taking as an example of non-professional video tape recorder, the maximum frequency of video signal may be deemed to be about 1 mc. In this case, the biasing signal frequency delivered from the biasing current source 94 can be selected to 4 mc., for instance.

In the course of the manufacture of the tape recorder, the adjustable winding 101*b* is set in combination with related capacitors 103 and 104 to the above-specified biasing frequency 4 mc., for instance, and the resonant circuit 107 is also set to the same resonant frequency. The left-hand half about chain-dotted line X–X′ of the biasing current source 94 in FIG. 1 constitutes in practice an oscillator, while the right-hand half of said source 94 consists of an amplifier. The resonant high frequency voltage delivered from the said oscillator is applied through capacitor 108 and resistor 109 onto the control grid 110 of pentode 96 and the amplified biasing current at the plate electrode 119 is fed through coupling capacitor 120 and shielded line 93 to the biasing coil 92 of the corresponding head 91.

Now referring also to FIGS. 2 and 3, the recording effect attainable by the present invention will be described hereinbelow. In these diagrams, the combined residual magnetism on the tape T is shown in function of recording currents. More specifically, in FIG. 2, the amplified television signal at (*a*) which corresponds to the output signal, FIG. 4 at (*d*), from the amplifier 23 is combined negatively through the intermediary of terminals 74, 84, 85 and 86 connected with each other as shown by dotted lines in FIG. 1, or in opposite phase with a series of separated and processed synchronizing pulses at (*b*) which corresponds to those from amplifier 62 as shown in FIG. 4 at (*c*). The resulted signal is shown at (*d*) in FIG. 2, when considering the biasing effect provided by the biasing head 91, as will be more fully described hereinafter.

On the contrary, in the case of FIG. 3, the amplified television signal, at (*a*), which is similar to that shown in FIG. 2, is combined positively in the aforementioned manner or in phase with the same series of separated and processed synchronizing pulses at (*c*) which are same as those shown at (*b*) in FIG. 2, yet of the opposite phase thereto. The result is shown schematically at (*e*) in FIG. 3 upon considering the biasing effect, as will be later described.

In either case, it will be seen that these two signals are combined together magnetically through the combined action of coil elements 89 and 82 and more specifically in an algebraic manner.

As mentioned hereinbefore with reference to FIG. 1, the amplitude of the separated synchronizing pulses and those of the television signal are modified in varied manner relative to each other, especially by proper manipulation of both potentiometers 24 and 61, respectively, so as to intensify the amplitude of the separated synchronizing pulses, resulting in recombined signals as at (*d*) and (*e*) in FIGS. 2 and 3, respectively as having highly accentuated synchronizing pulses contained negatively or positively therein, as the case may be.

The aforementioned processing operation must naturally be carried out relying upon the linear range of the characteristic curve, as at (*f*) in FIGS. 2 and 3, of the magnetic material coated on the tape T for avoiding disadvantageous and possible magnetic distortion of signals in the course of the magnetic recording with use of magnetic heads 83 and 91.

Voltage sources 39 and 77 may be selected to be 12–24 volts, while power source 98 may be in the order of 250–300 volts, by way of example. These sources may be connected with the circuit arrangement shown in FIG. 1 through the intermediary of a gang switch, not shown, which is mechanically connected with a manual record on-off control means, although again not shown.

For completing the description of the invention, two specific embodiments of the reproducing system adapted for reproducing the magnetic records made in the aforementioned inventive manner on the tape T will now be described hereinbelow by reference to FIGS. 5 and 6.

From the recorded tape T, modified television signals with accentuated synchronizing pulses are reproduced by means of a reproducing head 200. The pick-up signal is then fed to a pre-amplifier 201 and amplified therein, which signal may have a waveform such as exemplified in FIG. 4 at (*e*). This amplified signal fed from pre-amplifier 201 is partially applied to an equalizer amplifier 202, and also partially to a clamper circuit 203. In the former case, the signal is subjected to an equalization so as to compensate for distortion due to the aforementioned limited performance of the magnetic recording and reproducing. The output signal from the equalizer 202 may have a waveform, as exemplified in FIG. 7, wherein the peaks of the contained synchronizing pulses are positioned at considerably and variously different levels, as clearly seen from the same figure.

The clamper circuit 203 is so designed that the signal impressed thereto is clamped so that the positive peaks of the contained signal components such as those corresponding to synchronizing pulses are fixed at a predetermined, substantially constant level, whereupon the thus processed signal is fed to a clipper circuit 204 so as to develop a series of clipping signal pulses as shown exemplifyingly in FIG. 4 at (*f*).

These clipping pulses are applied then to a pulse shaper 205 so as to develop a series of output pulses having its waveform similar to that shown in FIG. 4 at (*b*), thus delivering a synchronizing pulse series.

The two kinds of output signals from the equalizer amplifier 202 and the pulse shaper 205 are applied together to a pulse clamp circuit 206 to develop modified television signals having its negative extremity clamped to a fixed level as shown in FIG. 4 at (*g*). In the case of FIG. 5, the clamped and modified television signal is applied to a processor amplifier 207. On the other hand, the output from the pulse shaper 205 is partially applied to the amplifier 207 in synchronism with the above-mentioned television signal through a pulse inverter amplifier 208, to develop a regular television signal, having the waveform as illustrated in FIG. 4 at (*a*). Said television signal is then coupled to a television monitor, not shown, through an output terminal 209.

Next, how the positively combined signal as at (*e*) in FIG. 3 is processed in the reproducing stage will be described by reference to FIG. 6. In this case, reference numerals 206–209 denote similar parts shown and described by reference to FIG. 5.

The output signal of the pulse clamp circuit 206 has a waveform as shown in FIG. 4 at (*h*), and is applied to develop a regular television signal as illustrated at (*a*) in FIG. 4. This television signal is then applied to the output terminal 209 through an amplifier 211. The operation is otherwise similar to that given in the foregoing by reference to FIG. 5.

In FIG. 8, several modified forms of record head are illustrated. In FIG. 8 at (A), the record head 83 is provided additionally with a biasing coil 92 which is electrically connected to the biasing current source 94. Thus, in this case, the biasing fluxes are superposed on the core of the head 83.

In a further modification shown in FIG. 8 at (B), the biasing current source 94 is electrically connected with one of the aforementioned record coils as at 89. In FIG. 8 at (C), the source is connected with the other record coil 82 in place of 89. Therefore, in these last two cases, the biasing currents are overlapped with the respective recording currents.

While the invention has been particularly shown and described with reference to substantially a preferred embodiment thereof, it will be understood by those skilled in the art that various changes in form, arrangement and details may be made therein without departing from the spirit and scope of the invention.

What we claim is:

1. In a magnetic television signal recording system, comprising input signal reception means adapted to be electrically connected to a television signal source, stationary recording magnetic head connected through an amplifier to said signal reception means and kept in sliding contact with an elongated magnetic tape and fed with television signals, the improvement comprising a synchronizing pulse separator electrically connected with said signal reception means for separating and amplifying the synchronizing pulses from the fed television signal, a first coil element wound on said head and electrically connected with said separator, and a second coil element wound again on said head and electrically connected with said amplifier, said two coil elements acting to combine magnetically and algebraically both the separated and amplified synchronizing pulses and the amplified television signal delivered from said amplifier, and said magnetic head magnetically recording the thus combined signal on said tape.

2. The improvement as set forth in claim 1, further comprising a biasing source, and a biasing head fed with a high frequency biasing current from said biasing source.

3. The improvement as set forth in claim 2, further comprising a phase inverter connected between said separator and said first coil element for reversing the phase of the separated synchronizing pulses.

4. The improvement as set forth in claim 1, wherein said separator comprises an emitter follower connected to receive the television signal, separating means connected to said emitter follower for developing a series of synchronizing pulses separated from the input signal, and an amplifier for amplifying said series of synchronizing pulses.

5. The improvement as set forth in claim 4, further comprising a biasing head fed with a high frequency biasing current from a biasing source.

6. The improvement as set forth in claim 4, further comprising a phase inverter connected between said separator and said first coil element.

7. The improvement as set forth in claim 1, further comprising a biasing source, and a third coil element wound on said head and fed with a high frequency biasing current from said biasing source.

8. The improvement as set forth in claim 1, further comprising a biasing source electrically connected to one of said first and second coil elements for supplying a high frequency biasing current thereto.

9. The improvement as set forth in claim 1, further comprising a second amplifier connected to the output of said separator and a phase inverter connected between said second amplifier and said first coil element for reversing the phase of the separated synchronizing pulses.

References Cited

UNITED STATES PATENTS

| | | | |
|---|---|---|---|
| 2,204,427 | 6/1940 | Moller | 178—7.7 |
| 3,180,929 | 4/1965 | Hibbard et al. | |
| 3,382,326 | 4/1968 | Camaras. | |
| 2,539,876 | 1/1951 | Behren. | |
| 3,368,032 | 2/1968 | Gooch et al. | |

OTHER REFERENCES

Transistor Television Receivers, T. D. Towers, John F. Rider Publisher Inc., New York.

Television Engineering Handbook, Donald F. Fink, 1, edition, McGraw-Hill Book Co. Inc., 1957.

ROBERT L. GRIFFIN, Primary Examiner

D. E. STOUT, Assistant Examiner

U.S. Cl. X.R.

178—69.5